Patented June 26, 1928.

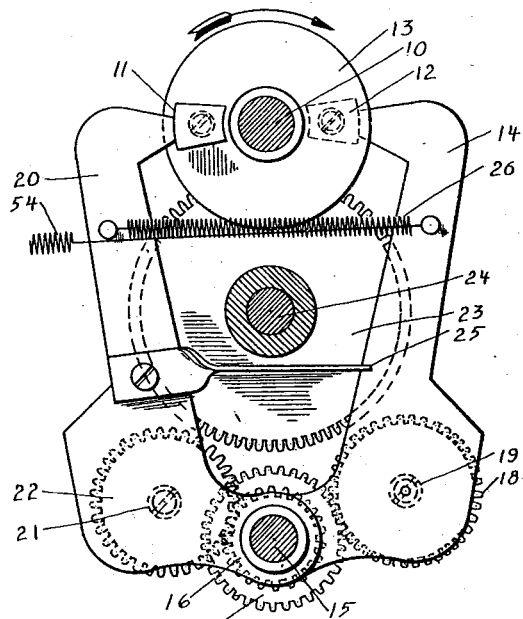

1,675,069

UNITED STATES PATENT OFFICE.

JOHN S. TRAUGUT, OF NEWARK, NEW JERSEY, ASSIGNOR TO OHMER FARE REGISTER COMPANY, OF DAYTON, OHIO, A CORPORATION OF NEW YORK.

ZONE RATE METER.

Application filed February 5, 1926. Serial No. 86,309.

This invention relates to an improvement on the taximeter shown and described in the patent of Julius Gluck 1,612,864, dated January 4, 1927, although, the invention forming the subject of the present application may be applied to any taximeter using two tariff rates.

In the said patent of Julius Gluck he has shown a means whereby either of two trains of gears may be utilized to actuate the fare registers. If, for instance, the flag is placed in the tariff position, one of the trains of gears would drive the fare registers at one rate for an initial period and thereafter at a different rate. In a word, the Gluck patent shows means whereby the registers may be driven at either of two rates of speed.

My invention relates to an improvement on such structure, and more specifically relates to means whereby the second gear train will automatically come into operation after the vehicle has traveled a predetermined distance without the necessity of the driver moving the flag shaft into a second tariff position. This is advisable especially where passengers desire to go to outlying districts or into the country. As long as the taxicab moves about the thickly populated section of a city the driver will probably pick up passengers on the return trip, but if he is employed to go into the country there is but little likelihood that he will find a passenger for the return trip. There is, therefore, a demand for a taximeter which will register a higher rate of fare for each mile traveled after a predetermined distance has been traversed.

Referring more particularly to the drawings,

Fig. 1 is a sectional view of the gear trains to drive the fare registers, and the controlling mechanism for the gear trains, which section corresponds to Fig. 5 of the said patent of Julius Gluck 1,612,864.

Fig. 2 is a vertical sectional view showing the lower part of the fare drum register unit, showing the position of the fare drums and of the transfer pinions when the flag is in vacant position, and showing in detail the means to automatically shift the second gear train into driving position, and Fig. 3 is an elevational view of the lower part of the mechanism shown in Fig. 2 and taken in a plane at right angles thereto.

The shaft 10 is the shaft which is rotated by the flag (not shown). The flag shaft 10 is provided with two cam lugs 11 and 12 on opposite sides of a disk 13. A lever or a shear 14 is fulcrumed on a driving shaft 15 which shaft 15 carries gears 16 and 17 rigidly mounted thereon. The gear 17 meshes with the gear 18 mounted on the stud shaft 19 carried by the shear 14. A similar shear 20 is fulcrumed on the shaft 15, which shear 20 carries a stud shaft 21 on which is mounted the gear 22 which is constantly in mesh with the gear 16. Either of the gears 18 or 22 will mesh with a larger gear 23 mounted on the driven shaft 24, provided the shears 14 or 20 do not hold the gears out of mesh. The shaft 24 is the main driven shaft which actuates the counters, the said shaft 24 being driven by means of the well-known star wheel not shown in this application but fully shown and described in the said patent of Julius Gluck.

The shear 20 is provided with a holding arm 25 which engages, at its end remote from the shear 20, the lower part of the shear 14. The two shears 14 and 20 are connected by means of a spring 26 which spring tends to pull each of the shears inwardly towards the shaft 10. The shaft 15 is provided with a disk 27 which disk carries two pins 28 180° apart. As these pins rotate they engage a cam surface 29 on an oscillating arm 30, and depress the same twice for each complete rotation of the shaft 15. A spring 31 is secured to the outer end of the arm 30 and to a fixed part of the taximeter, so that the arm 30 is normally pulled upward and is held under tension.

A lever 32 is pivoted at 33 to sidewall 34 of the taximeter and extends beyond said pivoted point, being provided at its outer end with a dog 35 secured thereto by means of a screw 36 or other suitable securing means. A stud shaft 37 is carried by the sidewall 34 and on the stud shaft 37 is rotatably mounted a ratchet 38. The dog 35 is normally pressed toward the ratchet 38 by means of a spring 39. The lever 32, at its inner end, is provided with a lug 40 extending at right angles to the lever 32 so as to engage the arm 30, the spring 39 tending to hold the lever 32 in the position shown in Fig. 2.

The dog 35 is provided with a pin 41. A lever 42 is secured on a fulcrum 43 to the sidewall 34 of the taximeter. At its upper end it engages a bell crank lever 44, which lever is fulcrumed at 45 to the sidewall 34 of the taximeter. The lever 44 carries the star wheels 46 which control the fare registers 47. The lever 44 is held under tension by means of a spring 48 so as to hold the nose 49 of the lever 44 in engagement with a cam pin 50 carried on the flag shaft 10, or so as to hold the star wheels 46 in engagement with the fare registers 47 when the cam 50 has been rotated out of engagement with the nose 49. A spring 51 normally holds the upper end of the lever 42 in engagement with the lower end of the lever 44, so that the lower end of the lever 42 engages the pin 41 on the dog 35 and holds the dog 35 out of engagement with the ratchet 38 when the flag shaft is in vacant position, as shown in Fig. 2. When the flag shaft has been rotated to any tariff position, the spring 48 causes the star wheels 46 to mesh with the register wheels 47 and rotates the lever 42 to a slight extent in an anti-clockwise direction so that the lower end thereof is removed from the pin 41 on the dog 35, and the spring 39 now pulls the dog 35 into engagement with the ratchet 38.

As the shaft 15 rotates when the flag shaft is in vacant position, the dog 35 being out of engagement with the ratchet 38 has no effect thereon. As soon, however, as the flag shaft is rotated to any tariff position, the dog 35 drives the ratchet 38 by means of pins 28 on the disk 27 on the shaft 15, alternately engaging the cam surface 29 so that the arm 30 is rocked up and down by means of the said pins 28 and the spring 31, which causes the lever 32 to oscillate and thereby reciprocate the dog 35 so as to rotate the ratchet 38.

The stud shaft 19 projects beyond the shear 14 and is engaged by an arcuate cam 52 carried by the ratchet 38, the stud shaft 19 sliding on the inner periphery of the cam 52 until it is disengaged therefrom.

When in the position shown in Fig. 1, the stud shaft 19 rests against the inner periphery of the cam 52 and against the lug 53 secured to the ratchet 38. If now the flag shaft be rotated for 90° into first tariff position, both of the lugs 11 and 12 will be rotated as shown by the arrow in Fig. 1, so that they will no longer be adjacent the upper ends of the shears 14 and 20, and the spring 26 will tend to pull both of these shears inwardly so as to engage both of the gears 18 and 22 with the gear 23. However, the stud shaft 19 engaging the arcuate cam 52 holds the shear 14 in approximately the position shown in Fig. 1, so that the gear 18 can not mesh with the gear 23. The motion from the shaft 15 is, therefore, transmitted through the gears 16 and 22 to the gear 23. As long as the vehicle is traveling, the pins 28 will be rotated in a counter-clockwise direction as viewed in Fig. 2, and the ratchet 38 will be actuated step by step in a clockwise direction through the medium of the arm 30, the lever 32, and the dog 35. The shear 14 is pressed against the cam 52 with considerable force which creates a sufficient resistance to overcome the tension of the spring 55 so that when the ratchet 38 has been actuated one or more steps it is held in that position as long as the shear 14 exerts its pressure against the cam 52. When, however, the cam 52 has moved beyond the stud shaft 19, the spring 54, secured to a sidewall of the taximeter and to the shear 14, will pull the shear 14 inwardly, engaging the arm 25 and pushing the shear 20 outwardly, so that the gear 18 will be caused to mesh with the gear 23 and the gear 22 will be moved out of mesh therewith, so that the motion from the shaft 15 is transmitted to the gear 23 through the gears 17 and 18 which are the second tariff gears and drive at a higher rate of speed than that heretofore described, for the reason that the gear 17 is larger than the gear 16. While driving in this second tariff position, the dog 35 continues to reciprocate but does not continue to rotate the ratchet 38, for as soon as the ratchet 38 moves in a clockwise direction, the spring 55 secured to the ratchet and to the sidewall 34 rotates the ratchet 38 in an anticlockwise direction until it strikes the stud shaft 19. The ratchet 38, therefore, is rotated only to the point where it is just beyond the stud shaft 19, and its motion thereafter is only a slight forward and backward motion which completely counteracts each other.

The taximeter will now be driven by the second train of gearing for the remainder of the journey. When the journey is completed, the driver will rotate the flag shaft in the direction of the arrow shown in Fig. 1, so as to complete its rotation. The cam lugs 11 and 12 will, immediately prior to the completion of the rotation of the flag shaft, engage the shears and spread them apart so as to disengage either of the trains of gearing which may be driving the gear 23. As the shear 14 is moved outwardly the stud shaft 19 is moved toward the shaft 37 to the extent that the spring 55 can rotate the ratchet 38 in a counter-clockwise direction until the lug 53 abuts against the stud shaft 19. While this operation is taking place, the dog 35 is held out of engagement with the ratchet 38 because the cam 50 has engaged the nose 49 of the lever 44, rotating the said lever in a counter-clockwise direction and the spring 51 has, therefore, been permitted to actuate the lever 42 in a clockwise direction, so that the lower end thereof engaged the pin 41 and disengaged the dog 35 and ratchet 38.

It is obvious that many changes may be made in the specific structure shown herein without departing from the spirit and scope of this invention. I, therefore, desire to broadly claim the invention in whatever form it may be embodied which may fall within the scope of the annexed claims.

Having now described my invention, I claim:

1. In a taximeter, a driving shaft, gears thereon, two shear members mounted on said driving shaft, a gear on each shear member adapted to be driven by the respective gears on the driving shaft, a driven shaft, a gear thereon, means whereby the gear on one of the shear members may be operatively connected with the gear on the driven shaft, and automatic means whereby the last mentioned gears are disconnected and the gear on the other shear member is brought into driving relation with the gear on the driven shaft after the vehicle has traveled a predetermined distance.

2. In a taximeter, a driving shaft, gears thereon, two shear members mounted on said driving shaft, a gear on each shear member adapted to be driven by the respective gears on the driving shaft, a driven shaft, a gear thereon, means whereby the gear on one of the shear members may be operatively connected with the gear on the driven shaft, automatic means whereby the last mentioned gears are disconnected and the gear on the other shear member is brought into driving relation with the gear on the driven shaft after the vehicle has traveled a predetermined distance, and means to prevent both of the gears on the shear members from simultaneously meshing with the gear on the driven shaft.

3. In a taximeter, a driving shaft, gears thereon, two shear members mounted on said driving shaft, a gear on each shear member adapted to be driven by the respective gears on the driving shaft, a driven shaft, a gear thereon, means whereby the gear on one of the shear members may be operatively connected with the gear on the driven shaft, automatic means whereby the last mentioned gears are disconnected and the gear on the other shear member is brought into driving relation with the gear on the driven shaft after the vehicle has traveled a predetermined distance, means tending to cause each of the gears on the shear members to mesh with the gear on the driven shaft, and means to prevent the gear on one of the shear members from meshing with the gear on the driven shaft when the gear on the other shear member is in mesh therewith.

4. In a taximeter, a driving shaft, a driven shaft, gears on the driving shaft and a gear on the driven shaft, shear members mounted on said driving shaft, a gear on each of said shear members in mesh with the respective gears on the driving member and either of which gears on the shear members may be caused to mesh with the gear on the driven member, means whereby one of the shear members is moved so that its gear will mesh with the gear on the driven member while the gear on the other shear member is held out of mesh therewith, and automatic means whereby both shears are moved so as to unmesh the gears which have been driving and to cause the gear on the other shear member to mesh with the gear on the driven member.

5. In a taximeter, driving and driven shafts, gears thereon, first and second shear members mounted on said driving shaft, a gear on each of said shear members, either of which may be caused to operatively connect the gears on the two shafts, a ratchet member driven by the driving shaft, and means interposed between said last named member and the first of said shear members to hold the gear on the first shear member inoperative until the vehicle has traveled a certain distance.

6. In a taximeter, driving and driven shafts, gears thereon, first and second shear members mounted on said driving shaft, a gear on each of said shear members, either of which may be caused to operatively connect the gears on the two shafts, a ratchet driven step by step by the driving shaft, and means interposed between said ratchet and the first of said shear members to hold the gear on the first shear member inoperative until the vehicle has traveled a certain distance.

7. In a taximeter, driving and driven shafts, gears thereon, first and second shear members mounted on said driving shaft, a gear on each of said shear members, either of which may be caused to operatively connect the gears on the two shafts, a ratchet driven step by step by the driving shaft, and means interposed between said ratchet and the first of said shear members to hold the gear on the first shear member inoperative until the vehicle has traveled a certain distance, said means including an arcuate member and a projection carried by said first shear adapted to be engaged by said arcuate member.

8. In a taximeter, driving and driven shafts, a shear member, gears on said shear member and said shafts, means to hold the gear on the shear member inoperative until the vehicle has traveled a certain distance, said last mentioned means including a ratchet, an arcuate member thereon, a projection carried by the shear member to engage the inner periphery of the arcuate member, means whereby said ratchet is actuated step by step as the vehicle travels, and means to move said shear member so that the gear thereon will operatively connect the gears on the driving and driven shafts as soon as the arcuate member has been rotated sufficiently to permit the projection to pass its end.

9. In a taximeter, driving and driven shafts, a shear member, gears on said shear member and said shafts, means to hold the gear on the shear member inoperative until the vehicle has traveled a certain distance, said last mentioned means including a ratchet, an arcuate member thereon, a projection carried by the shear member to engage the inner periphery of the arcuate member, means whereby said ratchet is actuated step by step as the vehicle travels, means to move said shear member so that the gear thereon will operatively connect the gears on the driving and driven shafts as soon as the arcuate member has been rotated sufficiently to permit the projection to pass its end, a flag shaft, and means controlled by the flag shaft whereby the ratchet and shear member are reset when the flag shaft is moved to vacant position.

In testimony whereof I affix my signature.

JOHN S. TRAUGUT.